United States Patent
Redmond et al.

(10) Patent No.: US 10,965,787 B2
(45) Date of Patent: Mar. 30, 2021

(54) SYSTEMS AND METHODS FOR AIRCRAFT INTERFACE DEVICE CONNECTIVITY WITH MOBILE DEVICES

(71) Applicant: Honeywell International Inc., Morris Plains, NJ (US)

(72) Inventors: Scott James Redmond, Phoenix, AZ (US); Paul R Drake, Peoria, AZ (US); Vijayshankaran Ramamoorthy Iyer, Glendale, AZ (US); John Todd, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/233,587

(22) Filed: Dec. 27, 2018

(65) Prior Publication Data

US 2019/0312957 A1   Oct. 10, 2019

Related U.S. Application Data

(60) Provisional application No. 62/652,673, filed on Apr. 4, 2018.

(51) Int. Cl.

| H04L 29/06 | (2006.01) |
|---|---|
| H04W 4/42 | (2018.01) |
| G06F 16/174 | (2019.01) |
| G06F 16/11 | (2019.01) |

(Continued)

(52) U.S. Cl.
CPC ............. *H04L 69/08* (2013.01); *B64D 43/00* (2013.01); *B64D 45/00* (2013.01); *G06F 13/00* (2013.01); *G06F 16/116* (2019.01); *G06F 16/1744* (2019.01); *G07C 5/008* (2013.01); *G07C 5/0808* (2013.01); *G08G 5/0021* (2013.01);

(Continued)

(58) Field of Classification Search
CPC ............... B64D 43/00; B64D 45/00; B64D 2045/0075; B64D 2045/0085; G06F 13/00; G06F 16/116; G06F 16/1744; G07C 5/008; G07C 5/0808; G08G 5/0021; G08G 5/0052; H04B 7/18506; H04L 67/02;

(Continued)

(56) References Cited

U.S. PATENT DOCUMENTS

| 8,751,067 B2 * | 6/2014 | Pham | G01C 23/00 |
|---|---|---|---|
| | | | 701/3 |
| 9,894,526 B2 * | 2/2018 | Giraud | G07C 5/008 |

(Continued)

FOREIGN PATENT DOCUMENTS

| EP | 2 869 247 A1 | 5/2015 |
|---|---|---|
| EP | 3 285 227 A1 | 2/2018 |

OTHER PUBLICATIONS

Extended European Search Report dated Aug. 7, 2019 in European Application No. 19166396.2 (10 pages).

*Primary Examiner* — Thomas J Dailey
(74) *Attorney, Agent, or Firm* — Bookoff McAndrews, PLLC

(57) ABSTRACT

A computer-implemented method for providing vehicle data to a mobile device is disclosed. The method may include: receiving raw vehicle data from one or more vehicle data streams using one or more protocols; recording the received raw vehicle data from the one or more vehicle data streams in a file format; and transmitting the recorded vehicle data to a mobile device having at least one application configured to interpret the transmitted vehicle data.

20 Claims, 2 Drawing Sheets

(51) Int. Cl.
*B64D 43/00* (2006.01)
*B64D 45/00* (2006.01)
*G07C 5/08* (2006.01)
*H04W 4/00* (2018.01)
*G08G 5/00* (2006.01)
*G06F 13/00* (2006.01)
*H04B 7/185* (2006.01)
*H04L 29/08* (2006.01)
*G07C 5/00* (2006.01)
*H04W 12/00* (2009.01)

(52) U.S. Cl.
CPC ....... *G08G 5/0052* (2013.01); *H04B 7/18506* (2013.01); *H04L 67/02* (2013.01); *H04L 69/04* (2013.01); *H04W 4/00* (2013.01); *H04W 4/42* (2018.02); *B64D 2045/0075* (2013.01); *B64D 2045/0085* (2013.01); *H04W 12/001* (2019.01)

(58) Field of Classification Search
CPC .......... H04L 69/04; H04L 69/08; H04W 4/00; H04W 4/42; H04W 12/001
See application file for complete search history.

(56) References Cited

U.S. PATENT DOCUMENTS

| | | | |
|---|---|---|---|
| 9,990,182 B2* | 6/2018 | Misra | G06F 8/00 |
| 2005/0026609 A1* | 2/2005 | Brinkley | G06F 8/61 |
| | | | 455/431 |
| 2007/0027589 A1 | 2/2007 | Brinkley et al. | |
| 2007/0028089 A1* | 2/2007 | Yukawa | G07C 5/008 |
| | | | 713/151 |
| 2009/0058682 A1* | 3/2009 | True | H04L 12/66 |
| | | | 340/971 |
| 2015/0106473 A1* | 4/2015 | Bobrek | H04L 67/12 |
| | | | 709/217 |
| 2015/0120097 A1* | 4/2015 | Hathaway | B64C 19/00 |
| | | | 701/14 |
| 2016/0050265 A1* | 2/2016 | Botticelli | H04L 67/125 |
| | | | 709/219 |
| 2016/0083118 A1* | 3/2016 | Mahalingaiah | G07C 5/0841 |
| | | | 701/32.1 |
| 2017/0148329 A1 | 5/2017 | Cornell | |

* cited by examiner

SYSTEMS AND METHODS FOR AIRCRAFT INTERFACE DEVICE CONNECTIVITY WITH MOBILE DEVICES

CROSS-REFERENCE TO RELATED APPLICATION(S)

This application claims the benefit of priority to U.S. Provisional Patent Application No. 62/652,673, filed Apr. 4, 2018, the entirety of which is incorporated by reference herein.

TECHNICAL FIELD

Various embodiments of the present disclosure relate generally to the field of aircraft information systems and, more particularly, to an aircraft interface device for accessing aircraft information streams.

BACKGROUND

Today, there exists an onboard aircraft device known as an Aircraft Interface Device ("AID"). Typically, the AID device connects to avionics and helps convert data into readable forms by other devices, such as electronic flight bags (EFBs). This is especially difficult to do across different aircraft types/operators, since the format of the avionics data varies from type to type and operator to operator. Since onboard devices are certified devices, software is expensive to develop and costly to change. Thus, although avionics recording/analyzing has been done on the ground as well as within onboard devices, barriers exist to using other devices, such as mobile devices, to decode raw avionics recordings and display data for an end user. Such a decoder application in a mobile device would provide significant advantages from a cost savings point of view since it may save money that currently is expended on certified software. Installation of a typical AID may be time consuming and may require individually wiring each Line Replaceable Unit (LRU) from which the AID needs data. Further, if the raw data is required to be off boarded via a satellite or other communications connection while in air in order for it to be decoded by ground servers, additional costs and inefficiencies are incurred by transmitting data to the ground and then receiving the results via a communications channel that may be expensive to operate.

The present disclosure is directed to overcoming one or more of these above-referenced challenges.

SUMMARY OF THE DISCLOSURE

In one aspect, a computer-implemented method for providing vehicle data to a mobile device is disclosed. The method may include: receiving raw vehicle data from one or more vehicle data streams using one or more protocols; recording the received raw vehicle data from the one or more vehicle data streams in a file format; and transmitting the recorded vehicle data to a mobile device having at least one application configured to interpret the transmitted vehicle data.

In another aspect, a method for providing vehicle data to applications on a mobile device is disclosed. The method may include: receiving, on the mobile device, vehicle data from a vehicle in a file format; interpreting the received vehicle data by at least one application on the mobile device; decoding, by the at least one application on the mobile device, the interpreted vehicle data; and displaying the decoded vehicle data on at least one of the mobile device or a second device.

In yet another aspect, a system for providing vehicle data to a mobile device is disclosed. The system may include: a memory having processor-readable instructions therein; and at least one processor configured to access the memory and execute the processor-readable instructions, which when executed by the processor configures the processor to perform a plurality of functions, including functions for: receiving raw vehicle data from one or more vehicle data streams using one or more protocols; recording, to the memory, the received raw vehicle data from the one or more vehicle data streams in a file format; and transmitting the recorded vehicle data to a mobile device having at least one application configured to interpret the transmitted vehicle data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
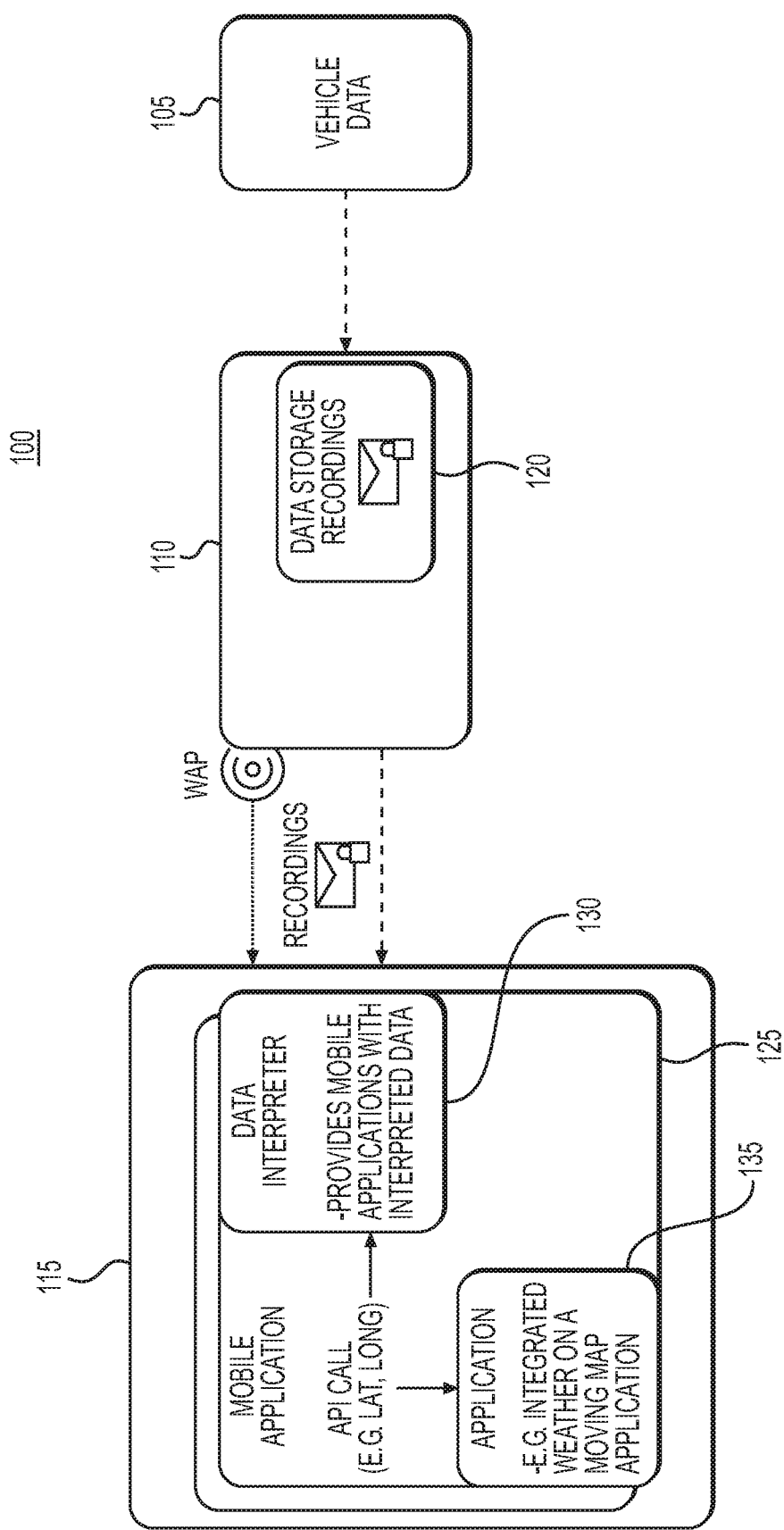
FIG. 1 depicts a vehicle interface device (VID) software stack, according to one or more embodiments.

Various embodiments of the present disclosure relate generally to an vehicle interface device for accessing vehicle information streams, and to a mobile device-connected vehicle interface device, and related methods. The systems and methods described below are described as applying to an aircraft but embodiments can be applied to any type of vehicle that implements an interface device for receiving vehicle data.

As discussed above, it may be difficult and costly to access information provided by an aircraft interface device due to certification requirements and differences between aircraft types. Ground-based solutions incur further costs due to expensive communications infrastructure. Embodiments of the present disclosure provide solutions to these barriers by using an onboard gateway device to perform raw recording of avionics data, such as data provided by a Quick Action Recorder (QAR or A717) or A429 data, and sending of the avionics data, wired or wirelessly, to a mobile device to be interpreted and parsed. Data such as airspeed or altitude could then be supplied by the decoder application to other mobile applications, such as EFB applications. One potential benefit of this approach is that the certified software that records avionics data may remain simple and common across aircraft types, and, thus, may be less prone to updates. The non-certified software portion may then be more easily and affordably updated to account for applying the gateway to new aircraft types or changes to existing installations.

Embodiments of the present disclosure may allow an application to be ported more easily to other mobile device applications to access the avionics data to support their functionality. Embodiments of the present disclosure may further allow the onboard device processing required to be minimized, potentially freeing up processor throughput for other tasks or to allow use of less powerful processors, potentially saving costs related to heating, power, weight, and equipment.

Embodiments of the present disclosure may be integrated with a connected aircraft platform, such as the Aircraft Data Gateway-300 (gateway) manufactured by Honeywell International Inc. Such a device may be installed on commercial aircraft, and connected to read data acquisition unit (DAU) data, such as Quick Action Recorder (QAR) data over an ARINC 717 connection, and one or more A429 connections.

The gateway may be loaded with configuration files that allow the recording function to be configured per the aircraft settings, so that the gateway software function can be used as common software across aircraft that have different standards for sending QAR or A429 data. The mobile device application may then be configured to request either A429 or QAR data from the gateway through a wired or wireless connection. The gateway may, for example, send a recording file or stream the raw data (potentially compressed or compressed/encrypted) to the mobile device for the mobile application to decode.

Alternatively, the gateway may stream the raw data to the mobile device directly. However, other means of transmitting the data to the mobile device may be employed, consistent with the present disclosure. For example, the gateway may provide an interface for users to request historical data from the gateway's recordings, so that the mobile device may not require an application to be running in the background at all times. The interface may allow users to obtain data for events that happened when the application was not open. The mobile application may then either use or send specific decoded parameters to another mobile application (possibly another module of the same application). An application such as an electronic flight bag (EFB) application may use the data to display data about the aircraft or do analytics/predictions with the data.

Embodiments of the present disclosure will be described in reference to the gateway. However, this disclosure should not be interpreted as limited to such a configuration. Integration with other connected aircraft platforms is possible.

FIG. 1 depicts a vehicle interface device (VID) software stack 100, according to one or more embodiments. In general, FIG. 1 depicts a vehicle data acquisition unit (DAU) 105, a vehicle gateway 110, and a mobile device 115. The vehicle gateway 110 may be in communication with vehicle DAU 105 by either a wired connection or a wireless connection. As such, vehicle gateway 110 may receive raw vehicle data from one or more vehicle data streams of the vehicle DAU 105. Vehicle gateway 110 may receive the raw vehicle data over one or more first protocols. The vehicle gateway 110 may further comprise a memory 120 for storing the received raw vehicle data from vehicle DAU 105.

Mobile device 115 may include at least one mobile application 125. Mobile device 115 may be connected to vehicle gateway 110 by either a wired connection or a wireless connection. The stored raw vehicle data may be transmitted from vehicle gateway 110 to mobile device 115 as a timestamped file or streamed to mobile device 115 in a first file format. The raw vehicle data may be interpreted and decoded by the at least one application 125 on mobile device 115. The at least one application 125 on mobile device 115 may include a software module, such as data interpreter 130, that may be configured to interpret the raw vehicle data on all platforms that vehicle gateway 110 is integrated on. The at least one application 125 on mobile device 115 may then decode the interpreted vehicle data. For example, the vehicle data may be decoded to actionable vehicle parameters. The actionable vehicle parameters may comprise data parameters relevant to the vehicle, such as speed and travel path.

The at least one application 125 on mobile device 115 may also format the decoded vehicle data to a second file format for use with one or more second protocols. The decoded and/or formatted vehicle data may then be displayed either on the mobile device 115 or a second device. For example, mobile device 115 may include a second application, such as weather application 135, to display integrated weather on a moving map. The VID software stack 100, described above, may provide the functionality of a VID, while not relying on embedded software to interpret the data. The VID software stack 100 may configure the gateway 110 to be integrated onto other platforms without updates to any certified software. Upon request of the at least one application 125, gateway 110 may pass the at least one application 125 the requested recorded vehicle data or stream raw data words directly to the mobile device 115. The recordings may be compressed and encrypted. The recordings may be from current travel data or historical travel data.

Figure 2:
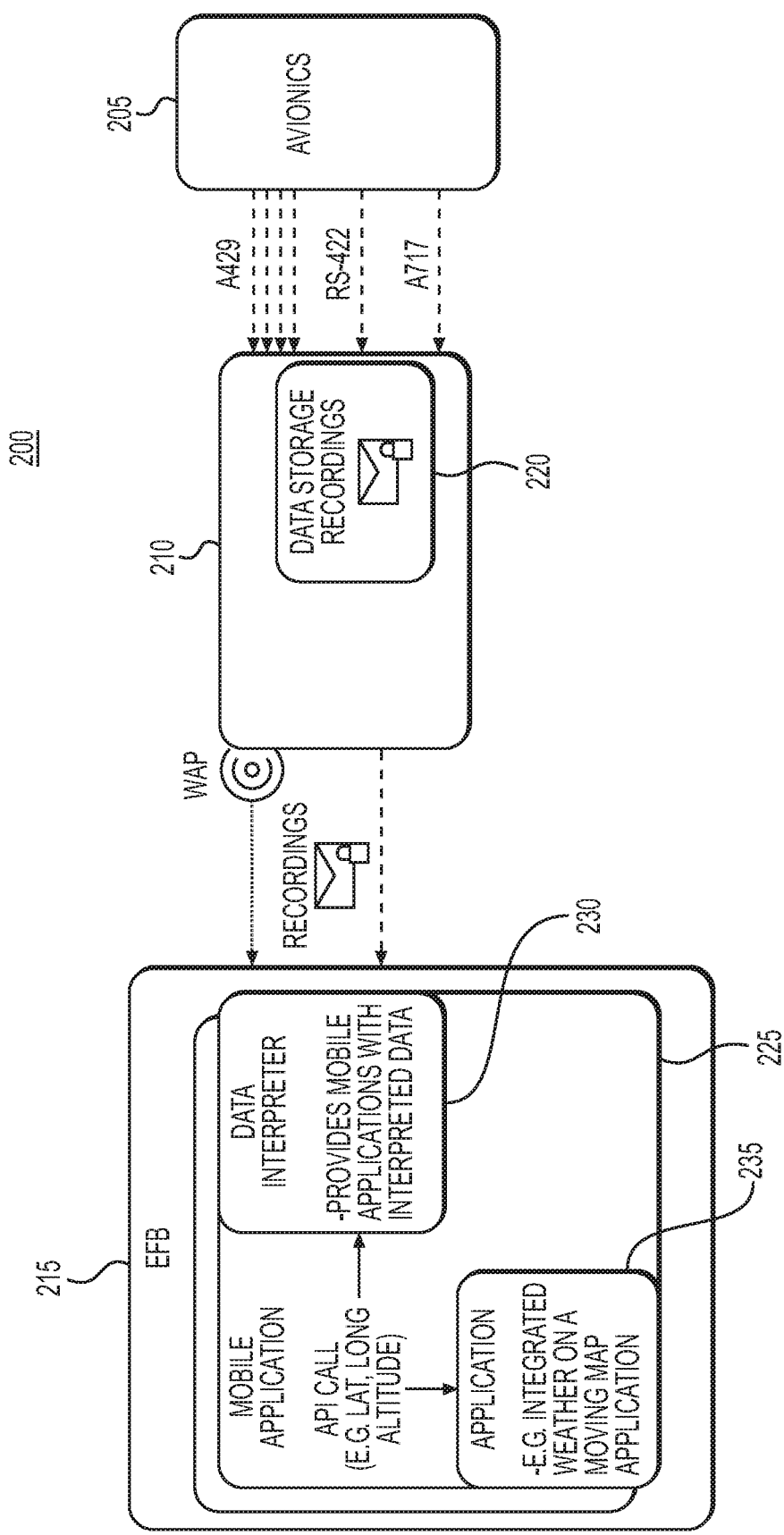
FIG. 2 depicts an Aircraft Interface Device (AID) software stack, according to one or more embodiments.

FIG. 2 depicts an aircraft interface device (AID) software stack 200, according to one or more embodiments. In general, FIG. 2 depicts an aircraft data acquisition unit (DAU) 205, a gateway 210, and a mobile device 215. The aircraft DAU 205 may include at least one of a quick access recorder (QAR) and/or other avionics equipment. The gateway 210 may be in communication with aircraft DAU 205 by either a wired connection or a wireless connection. As such, gateway 210 may receive raw aircraft data from one or more aircraft data streams of the aircraft DAU 205. For example, gateway 210 may receive the raw aircraft data over one or more first protocols, such as ARINC 429 (A429), ARINC 717 (A717), RS-422, or the like. Gateway 210 may further comprise a memory 220 for storing the received raw vehicle data from aircraft DAU 105.

Mobile device 215 may include at least one application 225. Mobile device 215 may be connected to gateway 210 by either a wired connection or a wireless connection. The stored raw aircraft data may be transmitted from gateway 210 to mobile device 215 as a timestamped file or streamed to mobile device 215 in a first file format. The raw aircraft data may be interpreted and decoded by the at least one application 225 on mobile device 215. The at least one application 225 on mobile device 215 may include a software module, such as data interpreter 230, that may be configured to interpret the raw aircraft data on all platforms that gateway 110 is integrated on. The at least one application 225 on mobile device 215 may then decode the interpreted aircraft data. For example, the aircraft data may be decoded to actionable aircraft parameters, such as flight parameters. The actionable aircraft parameters may comprise data parameters relevant to the aircraft, such as airspeed and altitude.

The at least one application 225 on mobile device 215 may also format the decoded aircraft data to a second file format for use with one or more second protocols, such as ARINC 429 (A429), ARINC 717 (A717), RS-422, or the like. The decoded and/or formatted aircraft data may then be displayed either on the mobile device 215 or a second device, such as an electronic flight bag (EFB). For example, mobile device 215 may include a second application, such as weather application 235, to display integrated weather on a moving map. The AID software stack 200, described above, may provide the functionality of an AID, while not relying on embedded software to interpret the data. The AID software stack 200 may configure the gateway 210 to be integrated onto other platforms without updates to any certified software. Upon request of the at least one application 225, gateway 210 may pass the at least one application 225 the requested recorded aircraft data or stream raw data words directly to the mobile device 215. The recordings may be compressed and encrypted, for example as a ZIP file. The recordings may be from current travel data or historical travel data.

Data communication in embodiments of the present disclosure may be wired or wireless data connections. For example, wired data connections may include Ethernet (such as 10/100BaseT), A429, A717 (QAR) data, GPS data, high or low speed avionics recording, discretes (such as "Weight on Wheels," LRU Mode Selectors), RS422 (available, such as Aircraft Condition Monitoring System). Wireless data connections may include one or more antennas (such as external client antenna, cabin WAP antenna, belly WAP Antenna), which may be able to connect to either Wi-Fi or cellular.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section.

Any suitable system infrastructure may be put into place to allow accessing of aircraft information streams. The accompanying drawings and the above discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in the accompanying drawings. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Other embodiments of the disclosure will be apparent to those skilled in the art from consideration of the specification and practice of the disclosed embodiments disclosed herein. It is intended that the specification and examples be considered as exemplary only, with a true scope and spirit of the invention being indicated by the following claims.

What is claimed is:

1. A computer-implemented method for providing vehicle data to a mobile device, the method comprising:
    receiving, by a vehicle data gateway onboard a first vehicle, raw vehicle data from one or more vehicle data streams using one or more first protocols;
    recording, by the vehicle data gateway, the received raw vehicle data from the one or more vehicle data streams in a first file format; and
    transmitting, by the vehicle data gateway, the recorded raw vehicle data to a mobile device;
    decoding, by at least one application on the mobile device, the transmitted raw vehicle data into actionable parameters;
    displaying, by the at least one application, the actionable parameters on the mobile device; and
    formatting, by the at least one application, the transmitted vehicle data to a second file format for use with one or more second protocols, wherein the one or more second protocols are different than the one or more first protocols.

2. The method of claim 1, wherein recording, by the vehicle data gateway, the received raw data comprises storing, by the vehicle data gateway, the received raw data on a memory.

3. The method of claim 1, wherein recording, by the vehicle data gateway, the received raw data in a file format is configured according to configuration settings of a vehicle.

4. The method of claim 1, further comprising compressing, by the vehicle data gateway, the recorded vehicle data and encrypting, by the vehicle data gateway, the compressed vehicle data.

5. The method of claim 1, wherein the one or more vehicle data streams includes at least one of a quick access recorder or avionics equipment.

6. The method of claim 1, wherein the mobile device is an electronic flight bag.

7. A method for providing vehicle data to applications on a mobile device, comprising:
- receiving, by at least one application on the mobile device, raw vehicle data from a vehicle data gateway onboard a first vehicle in a file format for use with one or more first protocols of the first vehicle;
- interpreting, by the at least one application, the received raw vehicle data;
- decoding, by the at least one application, the interpreted raw vehicle data;
- displaying, by the at least one application, the decoded vehicle data on at least one of the mobile device or a second device; and
- formatting, by the at least one application, the received vehicle data to a second file format for use with one or more second protocols, wherein the one or more second protocols are different than the one or more first protocols.

8. The method of claim 7, wherein the vehicle is an aircraft and the vehicle data is avionics data.

9. The method of claim 7, wherein decoding, by the at least one application, the interpreted vehicle data comprises decoding, by the at least one application, the vehicle data to actionable vehicle parameters.

10. The method of claim 9, wherein the actionable vehicle parameters are actionable aircraft and flight parameters.

11. The method of claim 7, further comprising transmitting, by the at least one application, the decoded vehicle data to the second device for displaying the decoded vehicle data on the second device.

12. A system for providing vehicle data to a mobile device, comprising:
- a memory having processor-readable instructions therein; and
- at least one processor configured to access the memory and execute the processor-readable instructions, which when executed by the processor configures the processor to perform a plurality of functions, including functions for:
  - receiving, by at least one application, raw vehicle data from a vehicle data gateway onboard a first vehicle in a first file format for use with one or more first protocols of the first vehicle;
  - interpreting, by the at least one application, the received raw vehicle data
  - decoding, by the at least one application, the interpreted raw vehicle data;
  - displaying, by the at least one application, the decoded vehicle data on at least one of the mobile device or a second device; and
  - formatting, by the at least one application, the received vehicle data to a second file format for use with one or more second protocols, wherein the one or more second protocols are different than the one or more first protocols.

13. The method of claim 1, further comprising:
- receiving, by the at least one application, second raw vehicle data from a second vehicle data gateway onboard a second vehicle in a third file format for use with one or more third protocols of the second vehicle;
- decoding, by the at least one application, the received second raw vehicle data into actionable parameters; and
- displaying, by the at least one application, the actionable parameters on the mobile device.

14. The method of claim 7, further comprising:
- receiving, by the at least one application, second raw vehicle data from a second vehicle data gateway onboard a second vehicle in a third file format for use with one or more third protocols of the second vehicle;
- interpreting, by the at least one application, the received second raw vehicle data;
- decoding, by the at least one application, the interpreted second raw vehicle data; and
- displaying, by the at least one application, the decoded second vehicle data on at least one of the mobile device or a third device.

15. The method of claim 7, wherein the mobile device is an electronic flight bag.

16. The system of claim 12, wherein the plurality of functions further include functions for:
- receiving, by at least one application, second raw vehicle data from a second vehicle data gateway onboard a second vehicle in a third file format for use with one or more third protocols of the second vehicle;
- interpreting, by the at least one application, the received second raw vehicle data;
- decoding, by the at least one application, the interpreted second raw vehicle data; and
- displaying, by the at least one application, the decoded second vehicle data on at least one of the mobile device or a third device.

17. The system of claim 12, wherein the vehicle is an aircraft and the vehicle data is avionics data.

18. The system of claim 12, wherein decoding, by the at least one application, the interpreted raw vehicle data comprises decoding, by the at least one application, the vehicle data to actionable vehicle parameters.

19. The system of claim 18, wherein the actionable vehicle parameters are actionable aircraft and flight parameters.

20. The system of claim 12, wherein the plurality of functions further include functions for: transmitting, by the at least one application, the decoded vehicle data to the second device for displaying the decoded vehicle data on the second device.

* * * * *